United States Patent
Stepanenko et al.

(10) Patent No.: US 6,296,697 B1
(45) Date of Patent: *Oct. 2, 2001

(54) THERMALLY INSULATING BUILDING MATERIAL

(75) Inventors: Alexandr Viktorovich Stepanenko, Kiev; Vladimir Ivanovich Martynov; Sergei Ilich Slanevsky, both of Odessa; Djudmila Alexeevna Eine, Kiev, all of (UA)

(73) Assignee: Wir Corporation, Northbrook, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,374
(22) PCT Filed: Apr. 12, 1996
(86) PCT No.: PCT/UA96/00007
§ 371 Date: Sep. 1, 1998
§ 102(e) Date: Sep. 1, 1998
(87) PCT Pub. No.: WO97/33843
PCT Pub. Date: Sep. 18, 1997

(30) Foreign Application Priority Data

Mar. 11, 1996 (UA) .................................................. 96030909

(51) Int. Cl.⁷ .......................... C04B 12/04; C04B 28/26; E04B 1/74; B29C 65/00
(52) U.S. Cl. .......................... 106/604; 106/600; 106/601; 252/62; 264/42
(58) Field of Search .............................. 252/378 R, 378 P, 252/62; 106/601, 602, 604; 264/42

(56) References Cited

U.S. PATENT DOCUMENTS 4,162,166 * 7/1979 Walls-Muycelo .................. 106/40 R
5,749,960 * 5/1998 Belyayev ............................ 106/600

FOREIGN PATENT DOCUMENTS

55010403A * 1/1980 (JP) .

* cited by examiner

Primary Examiner—Paul Thibodeau
Assistant Examiner—Sheeba Ahmed
(74) Attorney, Agent, or Firm—Abelman, Frayne & Schwab

(57) ABSTRACT

A heat-insulating constructional material based on an alkalized and flooded siliceous raw material fabricated by comminuting solid ingredients and mixing all the raw ingredients, steaming a raw mixture and thermally bloating intermediate products obtained from the steamed raw mixture is designed for utilisation as warmth-keeping fills and light-weight concrete aggregates (in a particulate form) and as structural elements for buildings and constructions (in the form of slabs or blocks). For the purpose of controlling the desired products in a wide range of dimensions and to achieve a greater stability in its mechanical strength and water adsorption the material is obtained by cooling the steamed raw mixture prior to its transition in a brittle condition and crushing the brittle mixture prior to bloating for obtaining the intermediate products.

3 Claims, No Drawings

THERMALLY INSULATING BUILDING MATERIAL

BACKGROUND OF THE INVENTION

1. Field of the Invention

This invention relates to thermally insulating building materials of an indeterminate ccomposition, which are prepared by low-temperature treatment of siliceous rock having a high content of amorphous silicon dioxide, usually higher than 70%, preferably higher than 80% by weight.

Such materials can be in particulate final state suitable for use as a loose thermal insulation, as aggregate in making mainly light-weight concrete, and as slabs or blocks which in most cases may be immediately used preferably as cladding for buildings and various structures.

2. Description of the Prior Art

The above-defined materials are produced on a mass scale and are under various conflicting requirements that are becoming increasingly more rigid.

Actually, it is very desirable that such materials exhibit as low bulk density (for loose particles) or density (for slabs and blocks) as possible and the lowest possible heat conductivity while offering the greatest possible strength and weather resistance, particularly under conditions characterised by freeze-defrost cycles.

It is further desirable that such materials be combinable with inert ingredients that will modify their mechanical and/or thermal properties, and be capable of production as final loose particles of arbitrary sizes and shapes or as blocks and slabs from readily accessible raw materials in a production process of a minimum power consumption, the product quality variations being kept within the narrowest range possible.

The above requirements can be now satisfied either separately or in some combinations only.

The siliceous raw materials, which are really not uncommon in the manufacture of thermally insulating building materials, are readily accessible. Among such raw materials belong siliceous minerals, such as diatomite, tripoli, gaize, spongolite, radiolarite, and their artificially prepared analogs. Of these latter materials, sodium silicate, e.g. soluble glass, is the best known and commercially available.

Thermally insulating building materials having relatively low bulk density (less than 1000 kg/m$^3$) and low heat conductivity are known to be obtained by preparing compositions capable of being heat expanded, forming intermediate products (preferably by agglomeration and particularly by pelletizing or jet granulation), and by expanding the intermediate products at high temperatures, usually above 800° C.

Building materials of this kind may be exemplified by a porous aggregate used in making mainly light-weight concrete and produced from siliceous rock containing from 30% to 98% by weight of silicon dioxide, no more than 20% by weight of aluminum oxide, no more than 25% by weight of calcium oxide and some other constituents. To produce such aggregate, an appropriate natural raw material is crushed, then roasted (usually in rotary kilns) at temperatures from 1080° C. to 1380° C., and the resulting product is cooled (V. N. Ivanenko, 'Building and civil engineering materials and shapes from siliceous rock', published 1978, by BUDIVEL-NYK Publishers (Kiev), see pages 49 to 58 [in Russian]).

Cracks visible to the unaided eye can always be found in such materials, this resulting in significant water absorption and a correspondingly low frost resistance. Also, high-temperature roasting involves an economically unacceptable specific power consumption.

More preferable are thermally insulating building materials produced from a process alkalized and wetted siliceous raw material by roasting at lower temperatures.

The term "alkalized", as used herein, refers to such siliceous raw materials in which a hydroxide of an alkali metal (preferably caustic soda) is inherently present or added, and the term "wetted" means that water is used during preparation of a raw mixture at least as an ingredient indispensable for preparing intermediate products.

Thermally insulating building materials produced from such raw materials may be exemplified by porous aggregate for light-weight concrete (artificial "gravel" or "sand") and thermally insulating boards ("foam glass") (See V. N. Ivanenko, pages 102 to 103 and pages 98 to 99, respectively, referred to above).

Production of such materials consists in preparation of a raw mixture of 100 parts by weight of powdered siliceous rock with a particle size of up to 0.14 mm, from 8 to 22 parts by weight of a hydroxide of an alkali metal, i.e. caustic soda or caustic potash, and from 18 to 38 parts by weight of water, obtaining an intermediate product and roasting it at a temperature of 1180° C. to 1200° C. to attain expansion.

The materials produced by the above-outlined process, compared with the earlier-mentioned porous aggregate, do have cracks resulting in high water absorption and a low frost resistance, though the process is moderately less power intensive.

Known in the art are materials based on the above-mentioned soluble glass, whose characteristics in terms of integrity, water absorption and frost resistance are better, since the soluble glass inherently contains from 6 to 20% of a hydroxide of an alkali metal. Soluble glass must be powdered and water must be added in the ratio of 9:1 by weight. Then the wetted powder is formed into an intermediate product which is steamed in a gaseous atmosphere containing more than 50% of superheated steam at 100° C. to 200° C. and above 0.1 MPa gage pressure. The steamed intermediate product is further heat treated (dried and/or calcined) at a temperature above 100° C., preferably above 800° C., to attain expansion (U.S. Pat. No. 3,498,802).

Hydrous sodium or potassium silicates present in the starting material significantly promote the forming of the intermediate product and provide for a noticeable reduction in specific power consumed in the heat treatment step.

Nontheless, it is doubtful that porous materials of low (less than 1000 kg/m$^3$) bulk density can be obtained from such raw materials at temperatures below 800° C.

The intermediate products at temperatures so high are expanded mainly due to polymorphic transformations in silica to result in a final product of loosened up structure and low mechanical strength, for one thing, and of above-mentioned increased water absorption and reduced frost resistance due to disintegration of surface layers, for the other. In some cases the strength of the product is too low for shipment to the site where it is to be used.

An appreciable increase in the strength of thermally insulating building materials, a reduction in water adsorption, and a reduction in specific power consumed in the production process have been disclosed in Ukrainian Patent No. 3802.

A thermally insulating building material of the above type, based on an alkalized and wetted siliceous raw material (containing in particular from 1 to 30 parts by weight a hydroxide of an alkali metal and from 30 to 125 parts by weight water per 100 parts by weight of the siliceous material) is obtained by comminuting the solid ingredients and mixing all the ingredients, steaming the mixture (specifically in the atmosphere of a saturated steam at a temperature of 80° C. to 100° C. for 20 to 60 min), to produce an intermediate product (usually by pelletizing) and heat expanding (e.g. at a temperature of 150° C. to 660° C.) the intermediate product. This is the material that bears closely on the invention.

Compared with other prior art materials, this one can be produced by a process that is the least power intensive, and with a comparatively low (from 50 to 950 kg/m$^3$) and readily controllable bulk density, it is noted for a wholly satisfactory porosity such that water adsorption is no more than 32.5% at worst, on the one hand, and sufficient mechanical strength, on the other.

These advantageous features are due to the steaming of the mixture which turns into a gelled viscous sticky low-melting mass based on hydrosilicates of alkali metals. This mass is substantially impermeable to low pressure gases and steam which are common to the steaming step under indicated temperature conditions, but when expanded it is slightly permeable to gases and steam.

The low-melt mass admits of low expanding temperatures and a corresponding low specific power consumption in the production of a final product, while the relative gas-impermeability of the mass provides for the indicated satisfactory porosity and sufficient strength.

However, the final thermally insulating building material produced according to Ukrainian Patent No. 3802 does not possess invariable qualities. The strength of pellets varies in the range of 0.02 to 12.5 MPa, and water adsorption in the range of 4% to 32.5%. What is more, in practice, on attempted control of pellet size in loose material it has appeared that the smaller the medium pellet size, the greater the number of rejected pellets due to aggregation or conglomeration of the pellets in the pelletizing and heat expanding steps; and on an attempted manufacture of building products such as blocks and slabs, negligible cracks and a total absence of open pores in the surface layers of intermediate products have proved to be obstacles to gases to be driven off during the expansion step, and the larger the building product, the greater obstacles. Building products with some (varied with composition) excessive dimensions have all been rejected.

This undesirable outcome is due to a combination of high viscosity and stickiness of the steamed mixture with its low gas permeability.

Attempts at reducing such outcome, by adding from 1 to 150 parts by weight of an inert mineral aggregate filler incapable of combining under said conditions of steaming into hydrosilicates of alkali metals, have not been successful in noticeably doing away with quality variability in the final product.

SUMMARY OF THE INVENTION

Therefore, an object of the present invention is to provide a thermally insulating building material capable of being made into final products of a wide variety of sizes by altering the process of producing such material.

A further object of the invention is to provide a thermally insulating building material exhibiting substantially less variable mechanical strength and water absorption attained in the process of producing such material.

These and other objects are accomplished by the provision of a thermally insulating building material produced from a comminutted alkalized and wetted natural siliceous raw material steamed and subsequently cooled to a friable body, said friable body crushed into an intermediate particulate product capable of being replasticized and expanded on heating in a single step, and the intermediate particulate product heat expanded, resulting in a final material exhibiting compression strength of no less than 0.45 MPa and water absorption of no more than 22.8% by weight.

As used herein the term "steaming" refers to one of the two substantially equivalent meanings. It means either treatment of an alkalized and prewetted (at least in part) siliceous raw material with steam to thereby warm up the raw material throughout and form hydrosilicates or saturation of an alkalized and completely prewetted siliceous raw material with steam by the action of heat from an external heat source.

The advantages of the present invention are gained due to an unexpected property that was found by experiment—it turned out that the intermediate particulate product obtained by crushing the friable body, which is nonsticky, is capable of being replasticized, when the product is sumbitted to heat expansion at temperatures above 100° C., preferably above 200° C., to become substantially less sticky than the gelled low-melting mass.

This suggests that the particles of the intermediate particulate product will conglomerate under conditions that are favorable for sticking together, for example, under compression or heat expansion in bulk.

Conglomeration will not occur, if the intermediate particulate product is subjected to heat expansion, with agitation as by shaking, or in a free-flowing motion. Therefore a person skilled in the art is able to obtain a desired particulate product in a wide range of sizes from "sand" to "gravel" by mere selection of conventional crushing means and conditions, the mechanical strength and water adsorption of particles being substantially kept within a desired narrow range.

It will be further noted that the intermediate particulate product can be stored for long (at least for a month) in bulk without coalescing and without loss in the capability to expand, on the one hand, or it can be used to form structures such as slabs and blocks for building and construction, on the other.

One aspect of the invention consists in that the intermediate particulate product capable of being heat expanded is classified by size prior to being heat expanded. An expanded particulate thermally insulating building material of a predetermined bulk density and heat conductivity, when obtained from such intermediate products, is immediately suitable for use as a thermal insulation and as a filler for light-weight concrete and outweighs disadvantages of the expanded clay production.

Another aspect of the invention consists in that the thermally insulating building material is produced from the intermediate particulate product containing a particulate filler incorporated therein prior to heat expansion, and the final material being formed as blocks or slabs exhibits a density of no more than 520 kg/m$^3$, compression strength of no less than 1.45 MPa and water absorption of no more than 22.6%.

Still another aspect of the invention consists in that the thermally insulating building material is produced from the intermediate particulate product containing a porous particulate filler.

For a particulate filler (of a predetermined average particle size) use can be made of natural materials such as pumice, tuff, shell rock, etc.; artificial porous materials such as claydite, crushed perlite, expanding vermiculite, expanded slag, porous sinter, etc.; and some other materials, mainly manufacturing wastes, for example cellulose scrap after papermaking, tan waste in leather manufacturing, and flax stock in flax processing industry.

The particulate fillers are useful for causing the intermediate product to expand between them and thus preventing formation of continuous steam and gas impermeable surface layers of substantially low heat-conductivity.

Therefore, a person skilled in the art is able (with a noticeable reduction in specific power consumption) to obtain slabs or blocks of predetermined shapes and dimensions by mere selection of intermediate product compositions and processing conditions.

DESCRIPTION OF THE PREFERRED EMBODIMENTS

The invention is hereinafter explained by way of specific examples of compositions for producing the thermally insulating building material of the invention, and of a description of the production processes and test results in consideration of the tables.

Siliceous materials suitable for use in carrying out the invention and their composition are shown in Table 1.

TABLE 1

Composition of siliceous materials

| Raw materials 1 | Composition, % by weight | | | | | | | | Quartz wt. % 10 |
|---|---|---|---|---|---|---|---|---|---|
| | $SiO_2$ 2 | $Al_2O_3$ 3 | $Fe_2O_3$ 4 | CaO 5 | MgO 6 | $Na_2O$ 7 | $K_2O$ 8 | c.l. 9 | |
| Opalized tuff | 93.3 | 2.5 | 0.5 | 0.6 | 0.1 | 0.7 | 0.3 | 2.0 | 30.5 |
| Silicified gaize | 85.4 | 2.3 | 6.1 | 1.2 | 0.6 | 0.2 | 0.2 | 4.0 | 2.3 |
| Tripoli | 83.1 | 5.7 | 4.5 | 1.4 | 0.8 | 0.5 | 0.4 | 3.6 | 10.2 |
| Soluble glass | 68.6 | 1.5 | 1.3 | 0.7 | 0.5 | 24.2 | 0.4 | 2.8 | 0.7 |

Notes:
(a) the abbreviation "c.l." designates calcination loss as evidence that organic impurities or water in crystal hydrates are present the raw material.

(b) in column 10, percentages stand for the proportion of quartz, or crystalline silicon dioxide, in the total amount of silica shown in column 2.

Sodium hydroxide in a 40% water solution was used as an experimental alkali.

The process for the production of the thermally insulating building material of the invention generally comprises the steps of comminuting siliceous materials preferably into particles ranging from 1.0 to 2.5 mm in an average size; proportioning the siliceous materials, a hydroxide of alkali metals, preferably sodium hydroxide, and water (or a solution of at least 40% caustic soda); alkalizing and wetting the siliceous material by mixing it with a hydroxide of an alkali metal and water (or with a water solution of such a hydroxide); steaming (with optional mixing) the resulting mixture at atmospheric pressure and at a temperature preferably in the range of 75° C. to 90° C. to attain formation of hydrated silicates, in the steaming step use being made either of a saturated steam, if the siliceous raw material was wetted only partially in the preparation of the mixture or of an external heat source to heat the mixture throughout until saturated with steam, if the mixture was completely wetted; cooling the steamed mixture to about room temperature (18–25° C.) or lower for a time period sufficient for the mixture to become friable; crushing the resulting friable body to obtain a particulate intermediate product; optionally classifying the intermediate product by size; preparing a mixture of the crushed intermediate product in a required proportion with porous aggregate of a required size; placing the mixture of the crushed intermediate product and the porous aggregate in split forms for heat treatment, if the material of the invention should be made into blocks or slabs; and heat treating (expanding) the intermediate particular product either at a temperature preferably of 200° C. to 250° C. for preferably 25 to 35 min. in order to produce the material of the invention in a particulate form, or at a temperature preferably of 250° C. to 450° C. for preferably 2.5 to 6 hours to produce the material of the invention in blocks or slabs.

In some cases (especially when "sand"-type small-size particles of the crushed intermediate product are used) it is advisable to add to the mixture of the crushed intermediate product and the porous aggregate a minor amount of water to make placement of the mixture and smoothing out its surface easier in preparation for heat expanding. It should be understood by those skilled in the art that vibration likewise can be resorted to.

Test materials were produced by the above-described process, including particulate materials of particle sizes up to 5 mm, from 5 to 10 mm, and from 10 to 20 mm and slabs or blocks, and cubic structures measuring 100 mm, 200 mm and 400 mm on the edge.

For comparison, thermally insulating building materials and structures of the same shape and dimensions were produced according to Ukrainian Patent No. 3802.

Specific compositions of the raw mixtures used in the experiments and process conditions are given in Tables 2 and 3.

TABLE 2

Compositions of raw mixtures, process conditions and physical characteristics of particulate thermally insulating building materials

| | Weight percentages of ingredients and process characteristics per sample | | | | | | | |
|---|---|---|---|---|---|---|---|---|
| | claimed | | | | proir art | | | |
| | #1 | #2 | #3 | #4 | #1 | #2 | #3 | #4 |
| Ingredients: | | | | | | | | |
| Opalized tuff | 100 | — | — | — | 100 | — | — | — |
| Silicified gaize | — | 100 | — | — | — | 100 | — | — |
| Tripoli | — | — | 100 | 100 | — | — | 100 | — |
| Sodium silicate in lumps | — | — | — | — | — | — | — | 100 |

TABLE 2-continued

Compositions of raw mixtures, process conditions and physical characteristics of particulate thermally insulating building materials Weight percentages of ingredients and process characteristics per sample

|  | claimed | | | | prior art | | | |
|---|---|---|---|---|---|---|---|---|
|  | #1 | #2 | #3 | #4 | #1 | #2 | #3 | #4 |
| Quartz sand | — | — | — | — | — | 150 | — | 100 |
| Quartzite | — | — | — | — | 1 | — | 100 | — |
| Hydroxide of alkali metal | 15 | 20 | 25 | 30 | 30 | 10 | 15 | — |
| Water | 60 | 50 | 40 | 30 | 80 | 30 | 125 | 30 |
| Physical characteristics: | | | | | | | | |
| Particle size, mm | 2.5 | 2.0 | 1.5 | 1.0 | 0.14 | 0.14 | 0.14 | 0.1 |
| Conditions: | | | | | | | | |
| Steaming: | | | | | | | | |
| - temperature, °C. | 90 | 80 | 75 | 75 | 100 | 80 | 90 | 90 |
| - time, min. | 45 | 40 | 40 | 40 | 60 | 20 | 30 | 30 |
| Cooling: | | | | | | | | |
| - temperature, °C. | 20 | 20 | 20 | 20 | — | — | — | — |
| - time, min. | 90 | 60 | 40 | 20 | — | — | — | — |
| Expanding: | | | | | | | | |
| - temperature, °C. | 200 | 220 | 250 | 250 | 660 | 150 | 300 | 300 |
| - time, min. | 35 | 30 | 25 | 25 | 10 | 120 | 30 | 30 |

TABLE 3

Compositions of raw mixtures, process conditions and physical characteristics of thermally insulting building materials in blocks Weight percentages of ingredients and process characteristics per sample

|  | claimed | | | | prior art | | | |
|---|---|---|---|---|---|---|---|---|
|  | #1 | #2 | #3 | #4 | #1 | #2 | #3 | #4 |
| Ingredients: | | | | | | | | |
| Opalized tuff | 100 | — | — | — | 100 | — | — | — |
| Silicified gaize | — | 100 | — | — | — | 100 | — | — |
| Tripoli | — | — | 100 | 100 | — | — | 100 | — |
| Sodium silicate in lumps | — | — | — | — | — | — | — | 100 |
| Quartz sand | — | — | — | — | — | — | — | 100 |
| Quartzite | — | — | — | — | — | 50 | 50 | — |
| Hydroxide of alkali metal | 15 | 20 | 25 | 30 | 30 | 15 | 25 | — |
| Water | 60 | 50 | 40 | 30 | 30 | 75 | 125 | 40 |
| Porous filler | 100 | 120 | 130 | 150 | — | — | — | — |
| Physical characteristics: | | | | | | | | |
| Particle size, mm | 2.5 | 2.0 | 1.5 | 1.0 | 0.14 | 0.14 | 0.14 | 0.1 |
| Conditions: | | | | | | | | |
| Steaming: | | | | | | | | |
| - temperature, °C. | 90 | 80 | 75 | 75 | 100 | 80 | 90 | 90 |
| - time, min | 45 | 40 | 40 | 40 | 45 | 20 | 30 | 30 |
| Cooling: | | | | | | | | |
| - temperature, °C. | 20 | 20 | 20 | 20 | — | — | — | — |
| - time, min. | 90 | 60 | 40 | 20 | — | — | — | — |
| Expanding: | | | | | | | | |
| - temperature, °C. | 350 | 250 | 450 | 350 | 660 | 450 | 600 | 300 |
| - time, min. | 150 | 300 | 250 | 250 | 180 | 420 | 300 | 300 |

Note: for the porous filler use was made of a particulate thermally insulating building material of the invention with particle size ranging from 5 to 15 mm and bulk density.

The claimed and prior art thermally insulating materials were tested for the following properties:

(a) particulate materials:

bulk density, kg/m$^3$, compression strength in a cylinder, MPa, water absorption, % by weight, rejects by size, % by weight;

(b) blocks and slabs;

density, kg/m$^3$, compression strength in a cylinder, MPa, water absorption, % by weight, cavernous rejects, % by weight;

Density and bulk density, compression strength and water adsorption were in all cases determined by conventional techniques. Rejects by size were determined as a proportion of particles of a size in excess of a predetermined average particle size in the aggregate produced. Cavernous rejects were determined as a proportion of manifestly cavernous cubic structures among the structures produced. The cubic structures were produced in batches of 100 each.

Test results for particulate and block materials are summarized in Tables 4 and 5 respectively. In the Tables, the units of measurement are not shown since they correspond to those mentioned above.

The data given in Table 4 show that the bulk density of the particulate thermally insulating building materials of the invention is notably less variable compared with that of prior art materials and can be controlled by changing proportions of the ingredients for the raw mixtures; the materials of the invention feature a narrower range of variability in terms of compression strength and water absorption, which are also controllable, and where bulk density is approaching that of prior art materials these properties are more preferable; and lastly the materials of the invention were rejected by size more than 10, 20, and 30 times as rarely as the prior art materials, and the particle size was practically immaterial in that.

Further, it should be noted that the ranges of controlling quality characteristics of the novel materials, which are certainly nonexhaustive, are suited to customers' demands.

The data of Table 5 show that that the density of the novel thermally insulating building materials in blocks (much as of the particulate materials) is also notably less variable compared with that of prior art materials and can be controlled by changing proprtions of the ingredients for the raw mixtures; the materials of the invention in blocks (much as the particulate materials) feature a narrower range of variability in terms of compression strength and water absorption, which are also controllable, and where density is approaching that of prior art materials these properties are more preferable; and lastly cavernous materials of the invention were detected rather rarely and dimensions of blocks (or slabs) are practically immaterial to the occurrence of cavities, while the prior art materials measuring more than 100 mm on the edge are rejected at an unacceptable level.

TABLE 4

Quality characteristics of particulate thermally insulating building materials

| | Test data per sample # | | | | | | | |
|---|---|---|---|---|---|---|---|---|
| | claimed | | | | prior art | | | |
| Property | #1 | #2 | #3 | #4 | #1 | #2 | #3 | #4 |
| Bulk density | 320 | 240 | 200 | 130 | 50 | 950 | 205 | 245 |
| Compression strength | 1.1 | 0.83 | 0.57 | 0.45 | 0.02 | 12.5 | 0.27 | 0.51 |
| Water absorption | 5.4 | 7.6 | 11.1 | 22.8 | 32.5 | 15.5 | 26.9 | 9.7 |
| Rejects by size: | | | | | | | | |
| up to 5 mm | 0 | 3 | 2 | 6 | 100 | 93 | 100 | 100 |
| 5 to 10 mm | 2 | 2 | 4 | 5 | 60 | 46 | 52 | 49 |
| 10 to 20 min | 0 | 2 | 3 | 5 | 25 | 23 | 33 | 27 |

TABLE 5

Quality characteristics of thermally insulating building materials in blocks

| | Test data per sample # | | | | | | | |
|---|---|---|---|---|---|---|---|---|
| | claimed | | | | prior art | | | |
| Property | #1 | #2 | #3 | #4 | #1 | #2 | #3 | #4 |
| Density | 520 | 490 | 440 | 430 | 580 | 1050 | 640 | 1110 |
| Compression strength | 2.1 | 2.0 | 1.57 | 1.45 | 1.02 | 4.5 | 1.2 | 7.51 |
| Water absorption | 15.2 | 17.5 | 21.1 | 22.6 | 35.2 | 18.4 | 32.1 | 15.1 |
| Rejects with edge length of: | | | | | | | | |
| 100 mm | 0 | 0 | 0 | 3 | 0 | 0 | 10 | 0 |
| 200 mm | 0 | 0 | 0 | 5 | 62 | 49 | 55 | 50 |
| 400 mm | 0 | 2 | 4 | 4 | 100 | 100 | 100 | 100 |

Again, it is to be noted that the upper limit of density of the novel materials in blocks, when the novel particulate material is used as a porous aggregate filler for the production of the blocks, proves to be lower than the lower limit of density of the prior art materials of the same type, water absorption and strength both being invariable.

What is claimed is:

1. A method for the manufacture of a thermally insulating building material, which comprises the steps of:
   (a) steaming a comminuted alkalized and wetted naturally-occurring siliceous raw material at a temperature of 75° C. to 90° C. and at atmospheric pressure to produce a gelled viscose sticky mass;
   (b) cooling said mass to about room temperature until it becomes friable;
   (c) crushing said cooled mass into an intermediate particulate product; and
   (d) heating said intermediate particulate product to a temperature of about 200° C. to about 450° C. and for a time period sufficient to attain expansion thereof into a thermally insulating building material.

2. The method of claim 1 wherein said intermediate particulate product is mixed with a particulate filler, placed in a form and subjected to said heating step at a temperature of about 250° C. to about 450° C. for about 2.5 hours to about 6 hours whereby the thermally insulating building material in the form of plates or slabs is obtained.

3. The method of claim 2 wherein said particulate filler is porous.

* * * * *